United States Patent
Nakagawa

(10) Patent No.: US 7,667,798 B2
(45) Date of Patent: Feb. 23, 2010

(54) LIQUID CRYSTAL DISPLAY DEVICE

(75) Inventor: Shigeo Nakagawa, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 116 days.

(21) Appl. No.: 12/010,179

(22) Filed: Jan. 22, 2008

(65) Prior Publication Data

US 2008/0192186 A1 Aug. 14, 2008

(30) Foreign Application Priority Data

Jan. 22, 2007 (JP) ............................... 2007-011933

(51) Int. Cl.
 *G02F 1/1333* (2006.01)
(52) U.S. Cl. ...................... 349/106; 349/110
(58) Field of Classification Search ................. 349/106, 349/153, 110, 58, 122, 111
See application file for complete search history.

(56) References Cited

U.S. PATENT DOCUMENTS

| | | | | |
|---|---|---|---|---|
| 6,400,439 B1* | 6/2002 | Fujioka et al. | ............... | 349/153 |
| 6,654,083 B1* | 11/2003 | Toda et al. | ................... | 349/110 |
| 7,253,866 B2* | 8/2007 | Moon et al. | ................. | 349/153 |
| 7,436,473 B2* | 10/2008 | Nam et al. | ................... | 349/110 |
| 2003/0137625 A1* | 7/2003 | Okazaki et al. | ............. | 349/113 |
| 2007/0263159 A1* | 11/2007 | Kobayashi et al. | .......... | 349/153 |

FOREIGN PATENT DOCUMENTS

| | | |
|---|---|---|
| JP | 10-170930 | 12/1996 |
| JP | 2002-090719 | 9/2000 |
| JP | 2004-294799 | 3/2003 |

* cited by examiner

*Primary Examiner*—Akm E Ullah
(74) *Attorney, Agent, or Firm*—Stites & Harbison PLLC; Juan Carlos A. Marquez, Esq.

(57) ABSTRACT

The present invention provides a liquid crystal display device which can enhance quality and reliability of image display by preventing the generation of bubbles in the inside of a liquid crystal display panel and, at the same time, by suppressing leaking of light from an end of a black matrix film. In the liquid crystal display panel which sandwiches a liquid crystal layer between two glass substrates, the liquid crystal layer is surrounded by a sealing material having a predetermined width. On one glass substrate, a black matrix film and an overcoat film are arranged from one-glass-substrate side such that the black matrix film and the overcoat film overlap the sealing material. The black matrix film is, in the widthwise direction of the sealing material, formed into a planar flat black matrix film until a middle position of the sealing material from a side on which the liquid crystal layer is arranged, and is formed into a slit-shaped slit black matrix film from the middle position. Due to such a constitution, an adhesion area between the glass substrate and the overcoat film under an applied region of the sealing material is enlarged and hence, an adhesion strength is increased thus largely enhancing an adhesion strength.

6 Claims, 13 Drawing Sheets

LIQUID CRYSTAL DISPLAY DEVICE

CROSS-REFERENCE TO RELATED APPLICATIONS

The disclosure of Japanese Patent Application No. 2007-11933 filed on Jan. 22, 2007 including the specification, drawings and abstract is incorporated herein by reference in its entirety.

BACKGROUND OF THE INVENTION

1. Field of the Invention

The present invention relates to a liquid crystal display device having a liquid crystal display panel which sandwiches a liquid crystal layer between a pair of substrates, and more particularly to the stacked structure of an organic resin film on a peripheral portion between a pair of substrates which is arranged to face each other in an opposed manner.

2. Description of the Related Art

A liquid crystal display device having a liquid crystal display panel is an image display device which is basically configured by sealing a liquid crystal layer between two substrates consisting of a first substrate and a second substrate preferably formed of a glass substrate respectively, and performs a display by making use of change of alignment direction of liquid crystal in response to an electric field applied to liquid crystal from pixel selection electrodes formed on the substrate. A whole-transmissive-type liquid crystal display device which has been popularly used currently adopts the structure in which a light-source light projected from a backlight mounted on a back surface of a liquid crystal display panel is polarized in the liquid crystal layer at an approximately 90 degrees and an electronic image is observed as a visible image by allowing the polarized light to pass through a polarizer.

FIG. 12 is an enlarged cross-sectional view of an essential part of a sealing portion for explaining one example of the constitution of a liquid crystal display panel which is applied to this type of color liquid crystal display device. Further, FIG. 13A to FIG. 13C are schematic constitutional views of an essential part showing the constitution in FIG. 12, wherein FIG. 13A is a cross-sectional view of the sealing portion in FIG. 12, FIG. 13B is a plan view of an essential part of an upper glass substrate in FIG. 13A as viewed from an inner surface side, and FIG. 13C is a perspective view of an essential part in FIG. 13B. In FIG. 12 and FIG. 13A to FIG. 13C, the liquid crystal display panel 100 includes a light-transmitting glass substrate 1 and the light-transmitting glass substrate 2.

On a display region 10 of the glass substrate 1, pixel electrodes 11 made of ITO or the like and thin film transistors 12 which constitute switching elements are arranged in a matrix array. A protective film 8 made of silicon oxide, silicon nitride or the like is formed on a whole upper surface of the glass substrate 1 in a state that the protective film 8 covers the pixel electrodes 11 and the thin film transistors 12. Further, an alignment film 7b made of polyimide, for example, is arranged on an upper surface of the protective film 8 within the display region 10, for example. In the drawing, numeral 10' indicates a non-display region.

Further, on the display region 10 of the glass substrate 2, a black matrix film 3 made of a resin material or the like is formed in a grid array, and respective color filters 4 consisting of red color filters, green color filters and blue color filters are arranged in respective grids. Further, a common electrode 6 made of ITO is arranged below the respective color filters 4 by way of an overcoat film 5. Here, the black matrix film 3 is formed between the red, green and blue color filters 4. Further, also on the boundary portion between the display region 10 and the non-display region 10', a black matrix film 3a is formed. Further, an alignment film 7a made of polyimide is arranged below the common electrode 6.

Further, the glass substrate 1 and the glass substrate 2 are adhered to each other by way of a sealing material 9 formed by printing on the non-display region 10' on a predetermined surface of either one of glass substrates 1, 2 and made of an epoxy resin material or the like containing spacers SP. To focus on a glass-substrate-2 side on which the color filters 4 are arranged, the sealing material 9 is adhered to an upper surface of the overcoat film 5. Further, a liquid crystal layer LC is sealed between an alignment film 7a and an alignment film 7b of both glass substrates arranged inside the sealing material 9. Further, the black matrix film 3a formed on the non-display region 10' is provided for preventing leaking of light from a periphery of the display region 10.

With respect to a liquid crystal display panel of this type, patent document 1 (Japanese Patent Laid-open Hei 10-170930) discloses the structure in which two electrode substrates are adhered to each other by way of a sealing material, an inner peripheral portion of the sealing material is made to overlap the black matrix film formed in a frame shape outside the display region, and an outer peripheral portion of the sealing material which does not overlap the black matrix film is directly adhered to the electrode substrate thus preventing leaking of light from an end portion of the black matrix film.

Further, with respect to another liquid crystal display panel of this type, patent document 2 (Japanese Patent Laid-open No. 2002-090719) discloses the structure in which outer end portions of two electrode substrates are laminated to each other by way of a sealing material, a first black matrix film is formed on the electrode substrate, and a second black matrix film is formed at a position where the second black matrix film overlaps the first black matrix film and does not overlap a display region thus suppressing leaking of a backlight light from a gap formed between the liquid crystal display panel and a metal frame.

Further, with respect to still another liquid crystal display panel of this type, patent document 3 (Japanese Patent Laid-open No. 2004-294799) discloses the structure in which outer end portions of two electrode substrates are laminated to each other by way of a sealing material, and a periphery of a display region is shielded from a light using a black matrix film extending over a frame-shaped sealing portion thus preventing leaking of light from a region defined between the display region and the sealing portion and, at the same time, further effectively enhancing an adhesion strength of the electrode substrates at the sealing portion.

SUMMARY OF THE INVENTION

The liquid crystal display panels having the above-mentioned constitutions can acquire a stable gap in a sealing-material applying portion and, at the same time, can prevent leaking of light due to the presence of the black matrix film even on an end portion of the electrode substrate. However, due to peeling-off of the black matrix film on an interface between the electrode substrate and a light shielding film, bubbles are liable to be easily generated in the inside of the display panel thus giving rise to drawbacks such as lowering of display quality or lowering of reliability. The generation of bubbles becomes particularly conspicuous in a liquid crystal display panel used as a vehicle-loaded device.

Further, with respect to another liquid crystal display panel of this type, there has been proposed the structure which adopts the duplicate structure in which a first black matrix film is arranged on an inner surface of an electrode substrate and a second black matrix film is arranged on an outer peripheral side of the first black matrix film by way of a gap, wherein an overcoat film is arranged to completely cover the whole first black matrix film and the whole second black matrix film and to extend to an end portion of the electrode substrate thus preventing leaking of light from end portions of the black matrix films. Due to such a constitution, the structure can acquire a stable gap in a sealing material applying portion and, at the same time, can prevent leaking of light. However, in the same manner as the above-mentioned liquid crystal display panel, due to peeling-off of the black matrix film on an interface between the electrode substrate and a light shielding film, there exists a drawback that bubbles are liable to be easily generated in the inside of a display panel.

Further, with respect to still another liquid crystal display panel of this type, there has been proposed the structure which arranges a black matrix film on an inner surface of an electrode substrate and the whole black matrix film is covered with an overcoat film. Due to such a constitution, the adhesiveness between the electrode substrate and the overcoat film can be enhanced and, at the same time, an adhesion area between a sealing material and the overcoat film is enlarged and hence, an adhesion strength can be enhanced. However, there exists a drawback that a gap becomes unstable in a sealing material applying portion due to the influence of a stepped portion of the overcoat film.

The present invention has been made to overcome the above-mentioned drawbacks of the related arts, and it is an object of the present invention to provide a liquid crystal display device which can prevent the generation of bubbles in the inside of the display panel and, at the same time, can suppress leaking of light from an end portion of a black matrix film by enhancing the adhesiveness of an interface between a glass substrate and the black matrix film in a sealing material applying portion (region) defined between two glass substrates arranged to face each other in an opposed manner thus enhancing quality and reliability of image display.

Further, it is another object of the present invention to provide a liquid crystal display device which can enhance quality and reliability of image display by acquiring a stable gap of a sealing material applying portion defined between two glass substrates arranged to face each other in an opposed manner and, at the same time, by enhancing an adhesion strength with the increase an adhesion area of a sealing material thus.

To achieve such objects, according to a first aspect of the present invention, there is provided a liquid crystal display device having a liquid crystal display panel formed by sandwiching a liquid crystal layer between a pair of substrates, wherein the liquid crystal display panel is configured such that the liquid crystal layer is surrounded by a sealing material having a predetermined width, a first organic resin film and a second organic resin film are arranged on one substrate out of the pair of substrates in a state that the first organic resin film and the second organic resin film overlap the sealing material from one substrate side, and the first organic resin film is formed, in the widthwise direction of the sealing material, into a planar shape until a middle position of the sealing material from a side on which the liquid crystal layer is arranged, and is formed into a slit shape from the middle position. Accordingly, an adhesion area between one substrate and the second organic resin film below the sealing-material-applied region is enlarged and hence, it is possible to overcome the drawbacks of the related art.

Further, according to a second aspect of the present invention, there is provided a liquid crystal display device having a liquid crystal display panel formed by sandwiching a liquid crystal layer between a pair of substrates, wherein the liquid crystal display panel is configured such that the liquid crystal layer is surrounded by a sealing material having a predetermined width, a first organic resin film and a second organic resin film are arranged on one substrate out of the pair of substrates in a state that the first organic resin film and the second organic resin film overlap the sealing material from one substrate side, and hole portions are formed in the first organic resin film. Accordingly, an adhesion area between one substrate and the second organic resin film below the sealing-material-applied region is enlarged and hence, it is possible to overcome the drawbacks of the related art.

Here, the present invention is not limited to the above-mentioned constitution and the constitution of the embodiments described later, and various modifications can be made without departing from the technical concept of the present invention.

According to the present invention, the adhesion area between one substrate and the second organic resin film below the sealing-material-applied region is enlarged and hence, an adhesion strength between one substrate and the stacked film over one substrate can be enhanced. Further, by forming unevenness on a film surface of the second organic resin film, the adhesion area between the second organic resin film and the sealing material is enlarged thus enhancing the adhesion strength on an adhesive interface between the second organic resin film and the sealing material. Accordingly, the adhesiveness can be largely enhanced and hence, the interface peeling-off hardly occurs whereby the generation of bubbles in the inside of the liquid crystal display panel can be eliminated thus giving rise to an extremely excellent advantageous effect that a liquid crystal display device of high quality and reliability can be realized.

BRIEF DESCRIPTION OF THE DRAWINGS

FIG. 4A to FIG. 4C are schematic constitutional views of an essential part of the sealing portion showing the constitution of the liquid crystal display panel, wherein FIG. 4A is a cross-sectional view of the sealing portion in FIG. 3, FIG. 4B is a plan view of a glass substrate in FIG. 4A as viewed from an inner surface side, and FIG. 4C is a perspective view of an essential part in FIG. 4B;

FIG. 7A to FIG. 7C are schematic constitutional views of an essential part of the sealing portion showing the constitution of the liquid crystal display panel, wherein FIG. 7A is a cross-sectional view of the sealing portion in FIG. 6, FIG. 7B is a plan view of a glass substrate in FIG. 7A as viewed from an inner surface side, and FIG. 7C is a perspective view of an essential part in FIG. 7B;

FIG. 13A to FIG. 13C are schematic constitutional views of an essential part showing the constitution in FIG. 12, wherein FIG. 13A is a cross-sectional view of the sealing portion in FIG. 12, FIG. 13B is a plan view of an essential part of an upper glass substrate in FIG. 13A as viewed from an inner surface side, and FIG. 13C is a perspective view of an essential part in FIG. 13B.

DESCRIPTION OF THE PREFERRED EMBODIMENT

Preferred embodiments of the present invention are explained in detail in conjunction with drawings showing these embodiments hereinafter.

Embodiment 1

Figure 1:
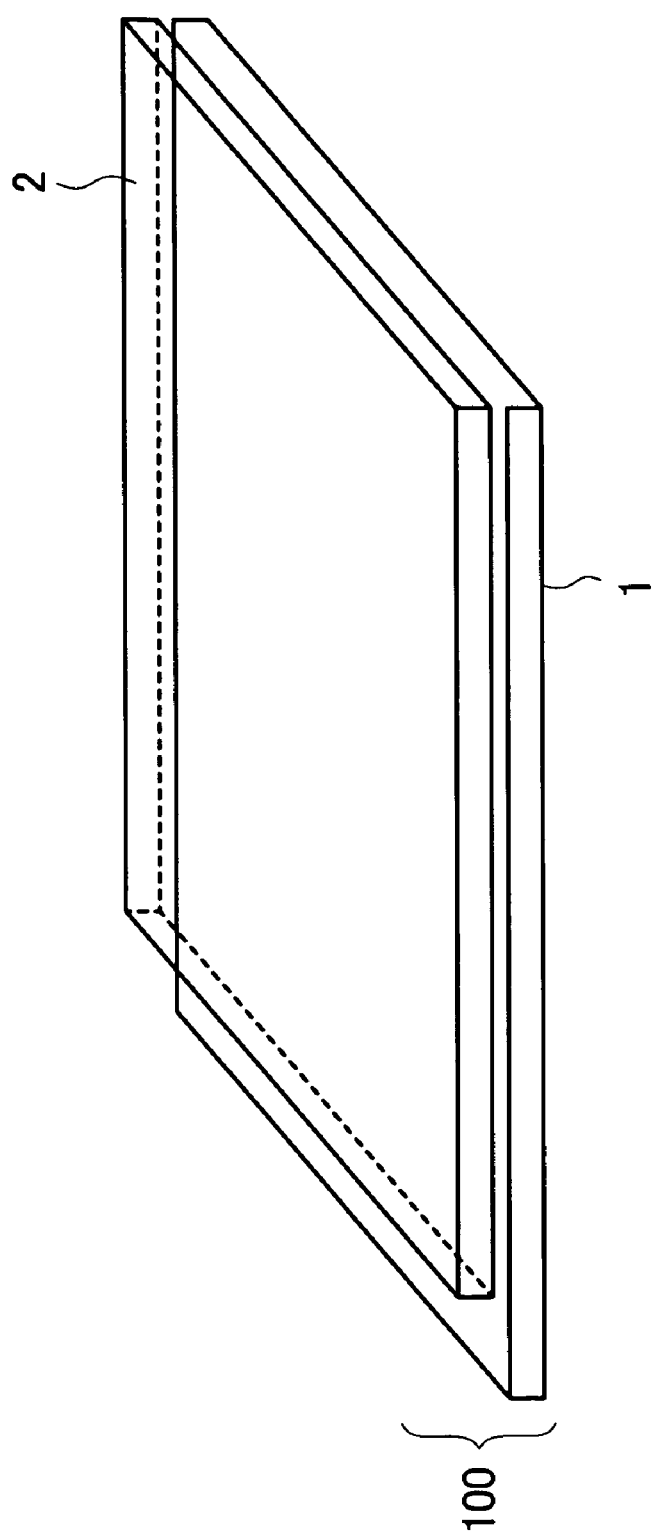
FIG. 1 is a schematic perspective view of an essential part for explaining the constitution of a liquid crystal display panel for explaining one embodiment of a liquid crystal display device according to the present invention.
Figure 2:
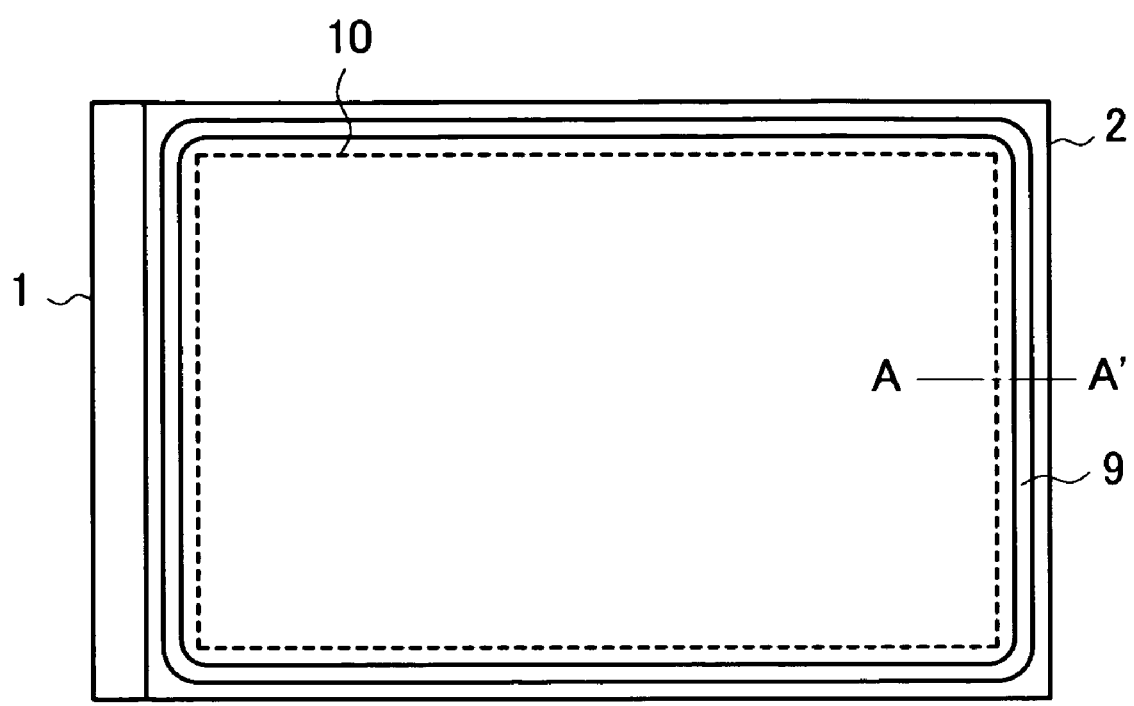
FIG. 2 is a schematic plan view of an essential part as viewed from above showing the constitution in FIG. 1.
Figure 3:
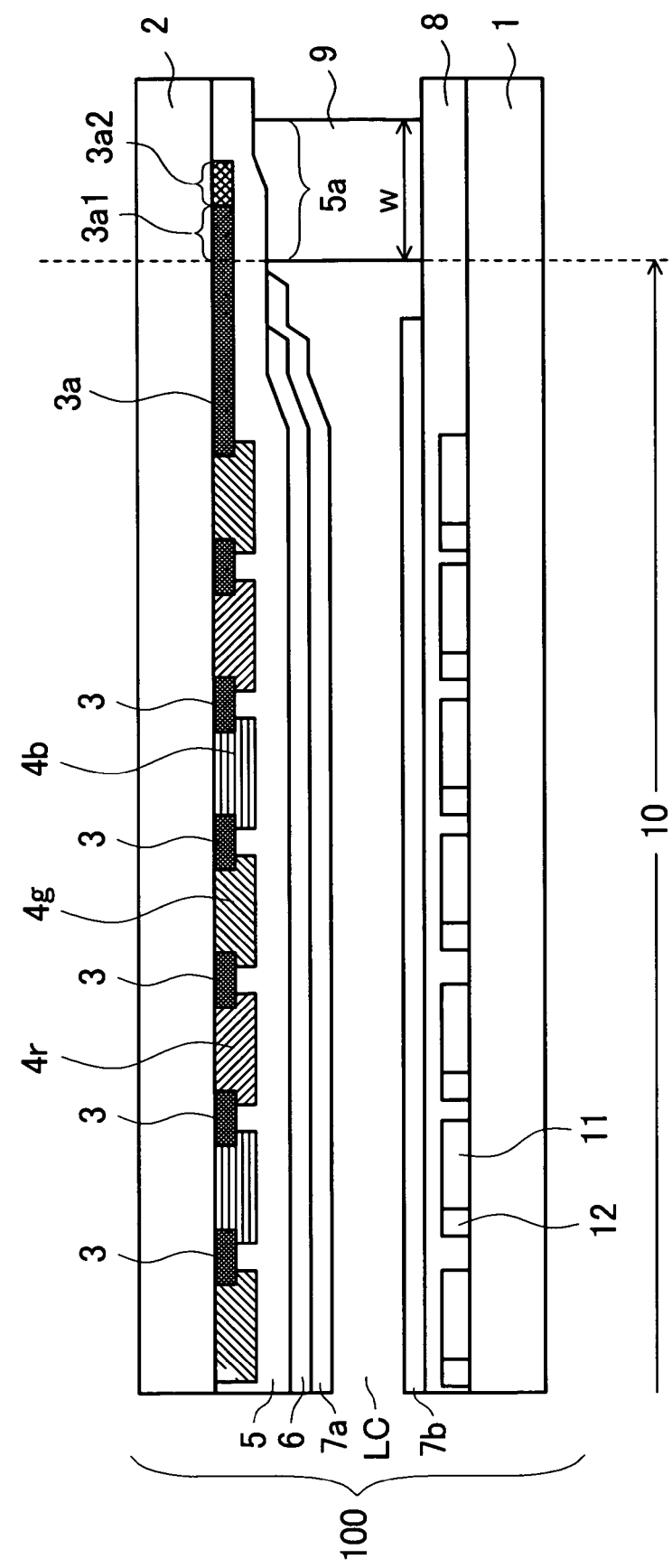
FIG. 3 is an enlarged cross-sectional view of an essential part of a sealing portion taken along a line A-A' in FIG. 2.
Figure 4A:
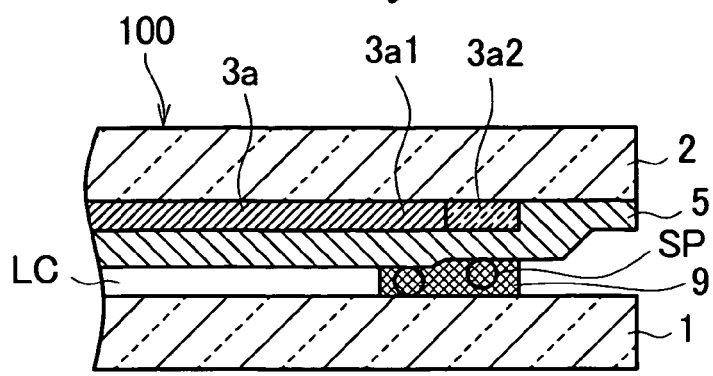
Figure 4B:
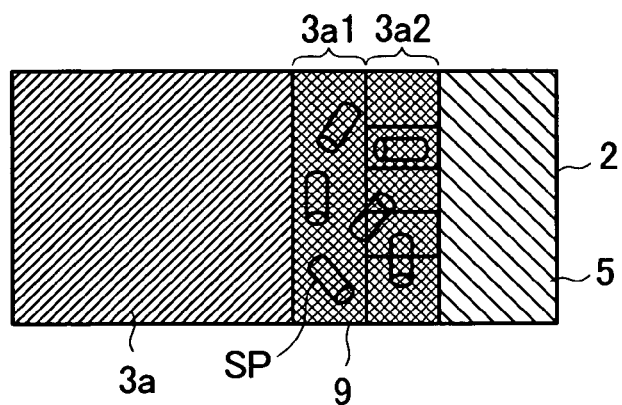
Figure 4C:
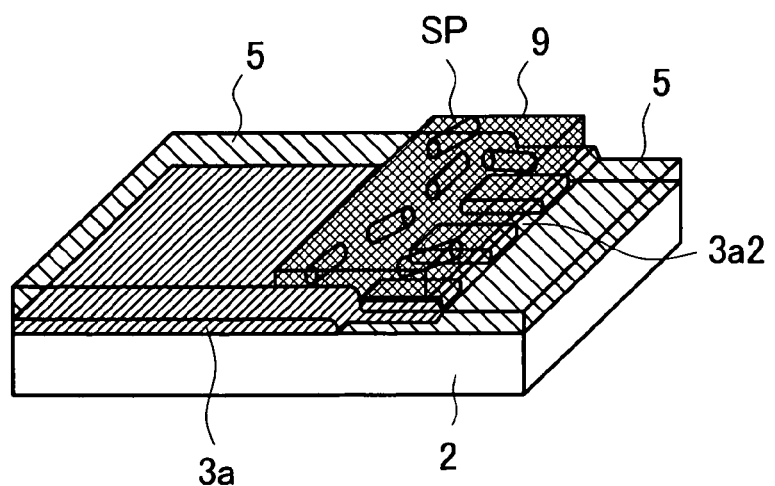

FIG. 1 is a schematic perspective view of an essential part for explaining the constitution of a liquid crystal display panel for explaining one embodiment of a liquid crystal display device according to the present invention. FIG. 2 is a schematic plan view of an essential part as viewed from above showing the constitution in FIG. 1. FIG. 3 is an enlarged cross-sectional view of an essential part of a sealing portion taken along a line A-A' in FIG. 2. FIG. 4A to FIG. 4C are schematic constitutional views of an essential part of the sealing portion showing the constitution of the liquid crystal display panel, wherein FIG. 4A is a cross-sectional view of the sealing portion in FIG. 3, FIG. 4B is a plan view of a glass substrate in FIG. 4A as viewed from an inner surface side, and FIG. 4C is a perspective view of an essential part in FIG. 4B. In all of the above-mentioned drawings, same symbols are given to identical parts and their explanations are omitted when unnecessary.

In FIG. 1 to FIG. 4C, a color liquid crystal display panel 100 is configured such that a light-transmitting glass substrate which forms a plurality of electrodes or the like on a inner surface thereof (also referred to as a thin film transistor substrate or a TFT substrate) 1 and a light-transmitting glass substrate which forms at least one electrode for forming a plurality of pixels on an inner surface thereof in regions where the electrode faces the plurality of electrodes in an opposed manner (also referred to as a color filter substrate or a CF substrate) 2 are arranged to face each other in an opposed manner, and a liquid crystal layer LC is sealed in a region surrounded by a frame-shaped sealing material 9 at peripheral portions of these glass substrates.

Further, on an upper surface of the glass substrate 2 within a display region 10, a black matrix film 3 is arranged as a first organic resin film. The black matrix film 3 is formed by applying a black resin material formed by dispersing carbon in an acrylic resin, for example, to the upper surface of the glass substrate 2 in a predetermined grid pattern. Further, a frame-shaped black matrix film 3a is integrally arranged on an outer peripheral portion of the black matrix film 3 contiguously with the original black matrix film 3.

Figure 5:
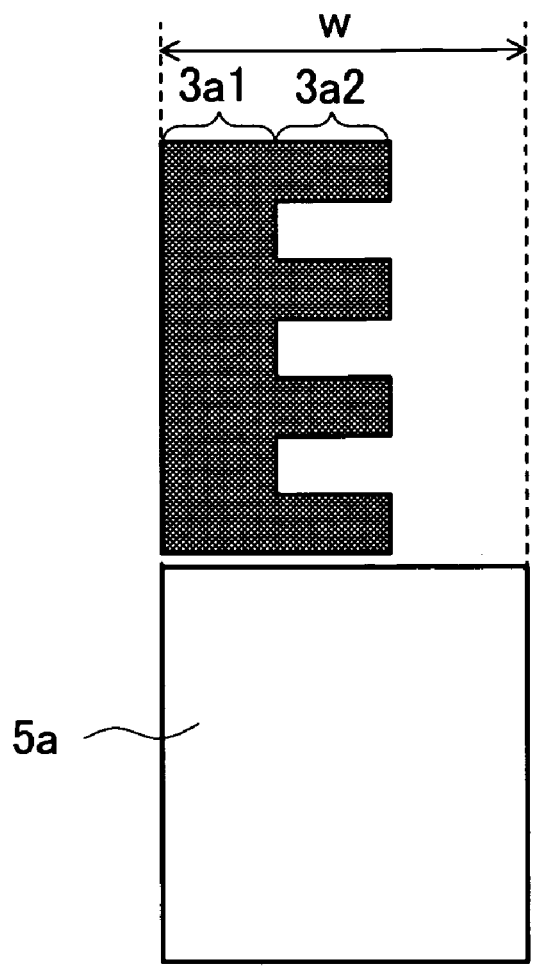
FIG. 5 is an enlarged plan view of an essential part for explaining the constitution of the sealing portion.

Further, on a substrate peripheral portion of the frame-shaped black matrix film 3a, as shown in FIG. 5 which is an enlarged plan view of an essential part of a sealing portion, in the seal-width-W direction of the sealing material 9, a flat black matrix film 3a1 and a slit black matrix film 3a2 are integrally formed at a portion 5a where the black matrix films 3a1, 3a2 overlap a sealing material 9. The flat black matrix film 3a1 is formed in a planar shape from a region where the liquid crystal layer LC is arranged to a middle position of the sealing material 9. Further, the slit black matrix film 3a2 is formed in a slit shape from the middle position of the sealing material 9.

That is, a pattern end of the black matrix film 3a in the peripheral portion of the substrate is, within a seal width W of the sealing material 9, formed in a comb-teeth-shaped slit pattern consisting of the flat black matrix film 3a1 and the slit black matrix film 3a2. A pattern width of the slit black matrix film 3a2 is set to the same width as shown in FIG. 5 which is the enlarged plan view of an essential part, and the slit black matrix film 3a2 is integrally formed with the frame-shaped black matrix film 3a1 over the whole circumference of the black matrix film 3a1. Further, these black matrix films 3a, 3a1, 3a2 are integrally formed by coating using the same material as the black matrix film 3 in the same step.

Further, as shown in FIG. 3, within a grid pattern of the black matrix film 3 formed within the display region 10, respective color filters 4r, 4g, 4b of red, green and blue are respectively arranged in a predetermined array, and a light-transmitting common electrode 6 made of ITO or the like is arranged below these color filters 4r, 4g, 4b. As a second organic resin film for protecting the black matrix film 3 and respective color filters 4r, 4g, 4b, an overcoat film 5 made of a light-transmitting acrylic resin material (MS33-P-727) or the like, for example, is arranged on the glass substrate 2.

The overcoat film 5 is arranged on the glass substrate 2 such that an outer peripheral portion of the overcoat film 5 wraps the whole surface of the comb-teeth-shaped slit pattern consisting of the flat black matrix film 3a1 and the slit black matrix film 3a2. The outer peripheral portion of the overcoat film 5 also enters slit portions formed in the slit black matrix film 3a2 and is adhered to an inner surface of the glass substrate 2. Still further, an alignment film 7a made of a polyimide material, for example, is arranged on a lower surface of the overcoat film 5.

Further, on an inner surface of the glass substrate 1 which is arranged to face the glass substrate 2 in an opposed manner, pixel electrodes 11 made of ITO or the like and thin film transistors 12 which constitute switching elements for selecting pixels are arranged in a matrix array. A protective film 8 made of silicon oxide, silicon nitride or the like, for example, is formed on a whole upper surface of the glass substrate 1 in a state that the protective film 8 covers the pixel electrodes 11 and the thin film transistors 12. Further, an alignment film 7b made of polyimide or the like, for example, is arranged on an upper side of the protective film 8.

Further, the glass substrate 1 and the glass substrate 2 are adhered to each other by way of the sealing material 9 formed by printing on an outer peripheral portion of a predetermined surface of either one of glass substrates. Here, the sealing material 9 is made of an epoxy resin material in which spacers SP formed of fibers, beads or the like are dispersed, for example. In this case, the sealing material 9 is adhered to the overcoat film 5 on the glass-substrate-2 side, and is adhered to the protective film 8 on the glass-substrate-1 side. Further, inside the sealing material 9, the liquid crystal layer LC is sealed between the alignment film 7a and an alignment film 7b formed on both glass substrates. Further, the flat black matrix film 3a1 and the slit black matrix film 3a2 which overlap the sealing material 9 prevent leaking of light from a periphery of the display region 10.

In the liquid crystal display panel 100 having such a constitution, due to the formation of the comb-teeth-shaped slit pattern consisting of the flat black matrix film 3a1 and the slit black matrix film 3a2 at the portion 5a of the substrate peripheral portion where the black matrix film 3a overlaps the sealing material 9, the overcoat film 5 enters the slit portions formed in the inside of the slit black matrix film 3a2 and hence, an adhesion area between the glass substrate 2 and the overcoat film 5 is enlarged thus largely enhancing an adhesion strength between the glass substrate 2 and the overcoat film 5.

Further, in the liquid crystal display panel 100 having such a constitution, a film surface of the overcoat film 5 to which the sealing material 9 is applied is formed into an uneven surface by being influenced by the comb-teeth shaped slit pattern consisting of the flat black matrix film 3a1 and the slit black matrix film 3a2 and hence, the adhesion area between the overcoat film 5 and the sealing material 9 is enlarged thus largely enhancing an adhesion strength of an interface between the overcoat film 5 and the sealing material 9.

Further, the adhesion strength of an interface between the glass substrate 2 and the black matrix film 3a, the adhesion strength of an interface between the black matrix film 3a and the overcoat film 5 and the adhesion strength of an interface between the glass substrate 1 and the protective film 8 are enhanced. Accordingly, the adhesiveness between the glass substrate 2 and the black matrix film 3a, the adhesiveness between the black matrix film 3a and the overcoat film 5 and the adhesiveness between the glass substrate 1 and the protective film 8 can be largely enhanced and hence, the interface peeling-off between the glass substrate 2 and the black matrix film 3a1 as well as between the glass substrate 2 and the black matrix film 3a2 hardly occurs whereby the generation of bubbles in the inside of the liquid crystal display panel can be surely suppressed.

Further, by setting a depth of recessed portions formed in the slit black matrix film 3a2 constituting the comb-teeth shaped slit pattern to a size substantially half of a coating width W of the sealing material 9, it is possible to prevent leaking of light from the sealing material 9. Further, by setting an arrangement pattern width of the slit black matrix film 3a2 to the same size, it is possible to acquire a uniform and stable seal gap formed by the sealing material 9.

Further, with the use of the sealing material 9 which mixes the spacers SP therein on a two-layered stacked film consisting of the flat black matrix film 3a1, the slit black matrix film 3a2 and the overcoat film 5 formed on the peripheral portion of an upper surface side of the glass substrate 2, the plurality of spacers SP play a role of supporting columns thus uniformly holding a gap between the glass substrate 1 and the glass substrate 2 whereby the uniformity of the brightness in a peripheral portion of the display region 10 can be maintained.

Embodiment 2

Figure 6:
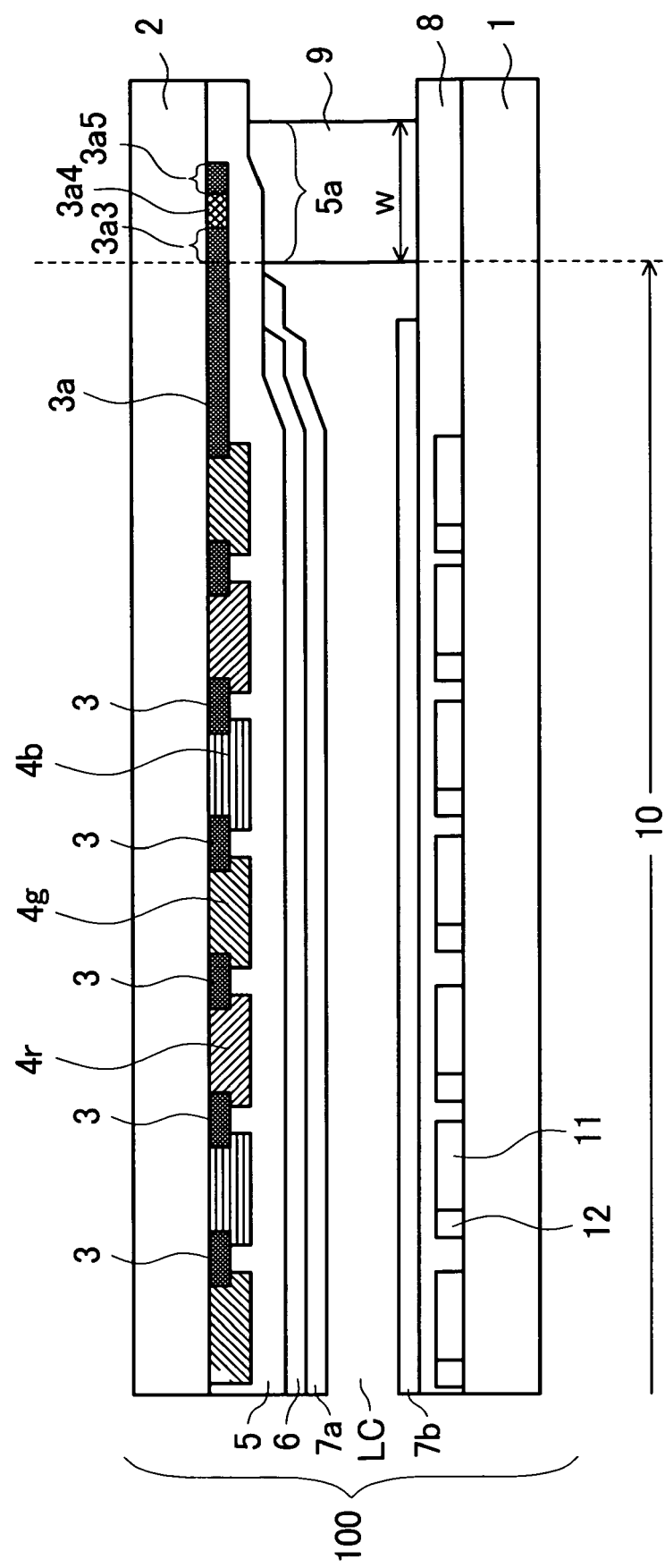
FIG. 6 is an enlarged cross-sectional view of an essential part of a sealing portion taken along a line A-A' in FIG. 2 for explaining the constitution of a liquid crystal display panel for explaining another embodiment of a liquid crystal display device according to the present invention.
Figure 7A:
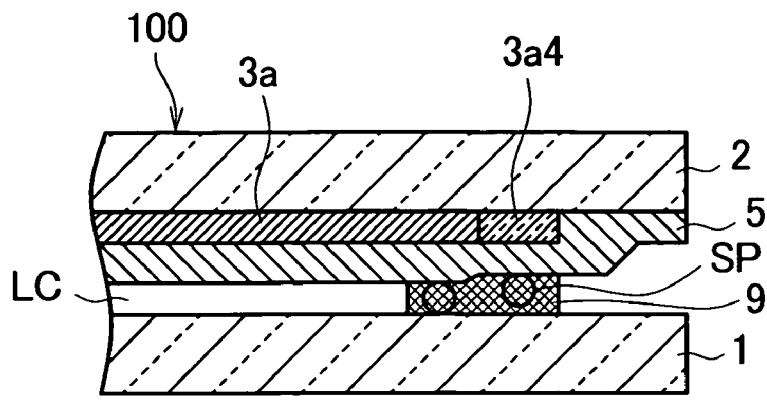
Figure 7B:
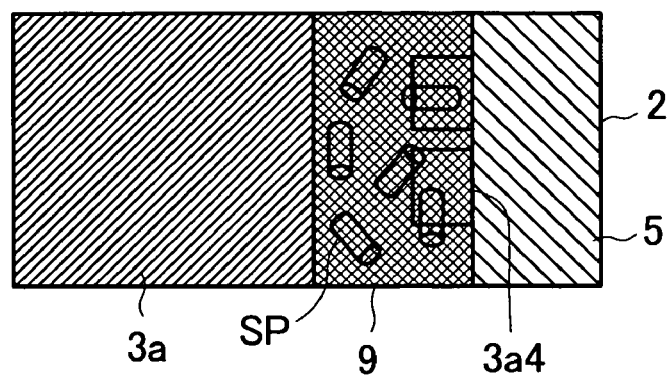
Figure 7C:
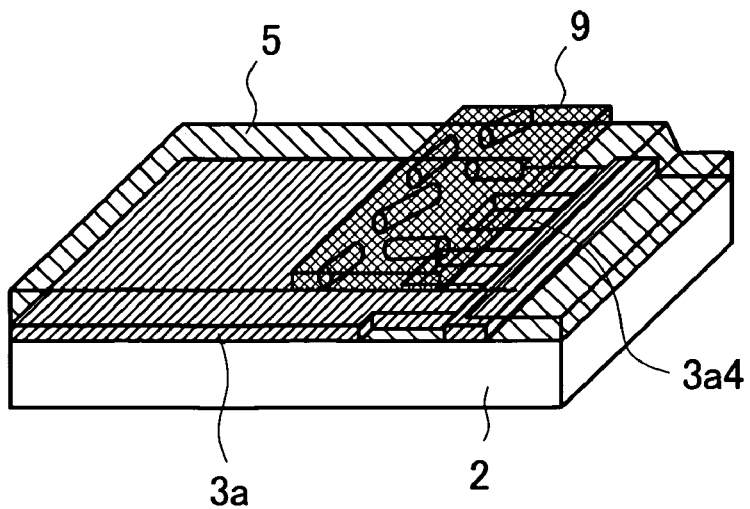

FIG. 6 is an enlarged cross-sectional view of an essential part of a sealing portion taken along a line A-A' in FIG. 2 for explaining the constitution of a liquid crystal display panel for explaining another embodiment of a liquid crystal display device according to the present invention. FIG. 7A to FIG. 7C are schematic constitutional views of an essential part of the sealing portion showing the constitution of the liquid crystal display panel, wherein FIG. 7A is a cross-sectional view of the sealing portion in FIG. 6, FIG. 7B is a plan view of a glass substrate in FIG. 7A as viewed from an inner surface side, and FIG. 7C is a perspective view of an essential part in FIG. 7B. In all of the above-mentioned drawings, same symbols are given to identical parts and their explanations are omitted when unnecessary.

Figure 8:
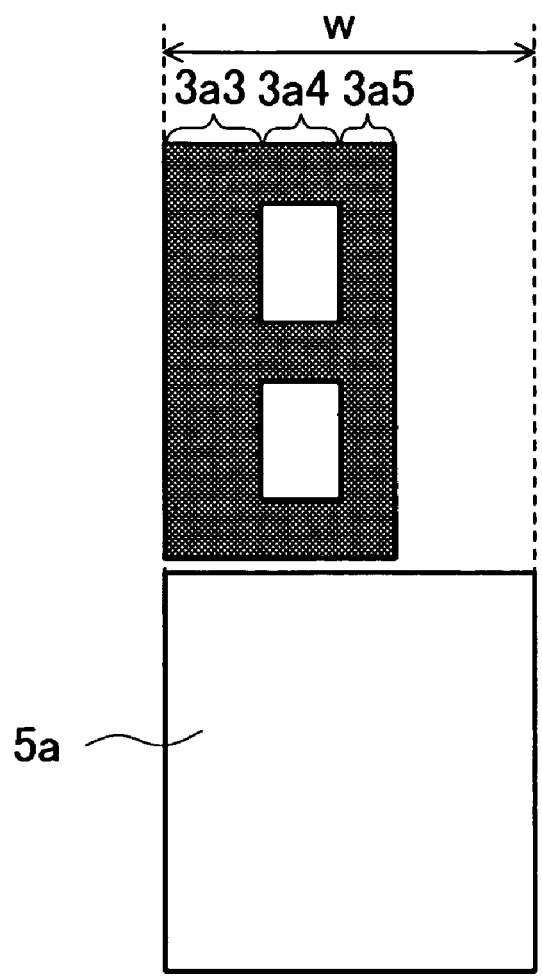
FIG. 8 is an enlarged plan view of an essential part for explaining the constitution of the sealing portion.

In FIG. 6 and FIG. 7, the liquid crystal display panel 100 is constituted different from the liquid crystal display panel 100 of the embodiment 1 in the following point. On a peripheral portion of the frame-shaped black matrix film 3a arranged at an end of the substrate, as shown in FIG. 8 which is an enlarged plan view of an essential part of a sealing portion, in the coating-width-W direction of the sealing material 9, a flat black matrix film 3a3, a black matrix film 3a4 with holes and a flat black matrix film 3a5 are integrally formed at a portion 5a where the black matrix films 3a3, 3a4, 3a5 overlap the sealing material 9. Here, the flat black matrix film 3a3 is formed in a planar shape from a side where the liquid crystal layer LC is arranged to a middle position of the sealing material 9. Further, the black matrix film 3a4 with holes is formed at the middle position of the sealing material 9. Still further, the flat black matrix film 3a5 is formed contiguously with the flat black matrix film 3a3.

That is, a hole opening pattern which forms the black matrix film 3a4 with holes between the flat black matrix films 3a3, 3a4 is applied to a peripheral portion of the frame-shaped black matrix film 3a. Here, these black matrix films 3a, 3a3, 3a4, 3a5 are integrally formed by coating using the same material as the black matrix film 3 in the same step.

Also in the liquid crystal display panel 100 having such a constitution, due to the formation of the black matrix film 3a4 with holes at the portion 5a of the substrate peripheral portion where the black matrix film 3a overlap the sealing material 9, the overcoat film 5 enters holes of the opening pattern of the black matrix film 3a4 with holes and hence, an adhesion area between the glass substrate 2 and the overcoat film 5 is enlarged thus largely enhancing an adhesion strength between the glass substrate 2 and the overcoat film 5.

Further, the liquid crystal display panel 100 having such a constitution can also acquire the substantially equal manner of operation and advantageous effects described in the above-mentioned embodiment 1.

Figure 9:
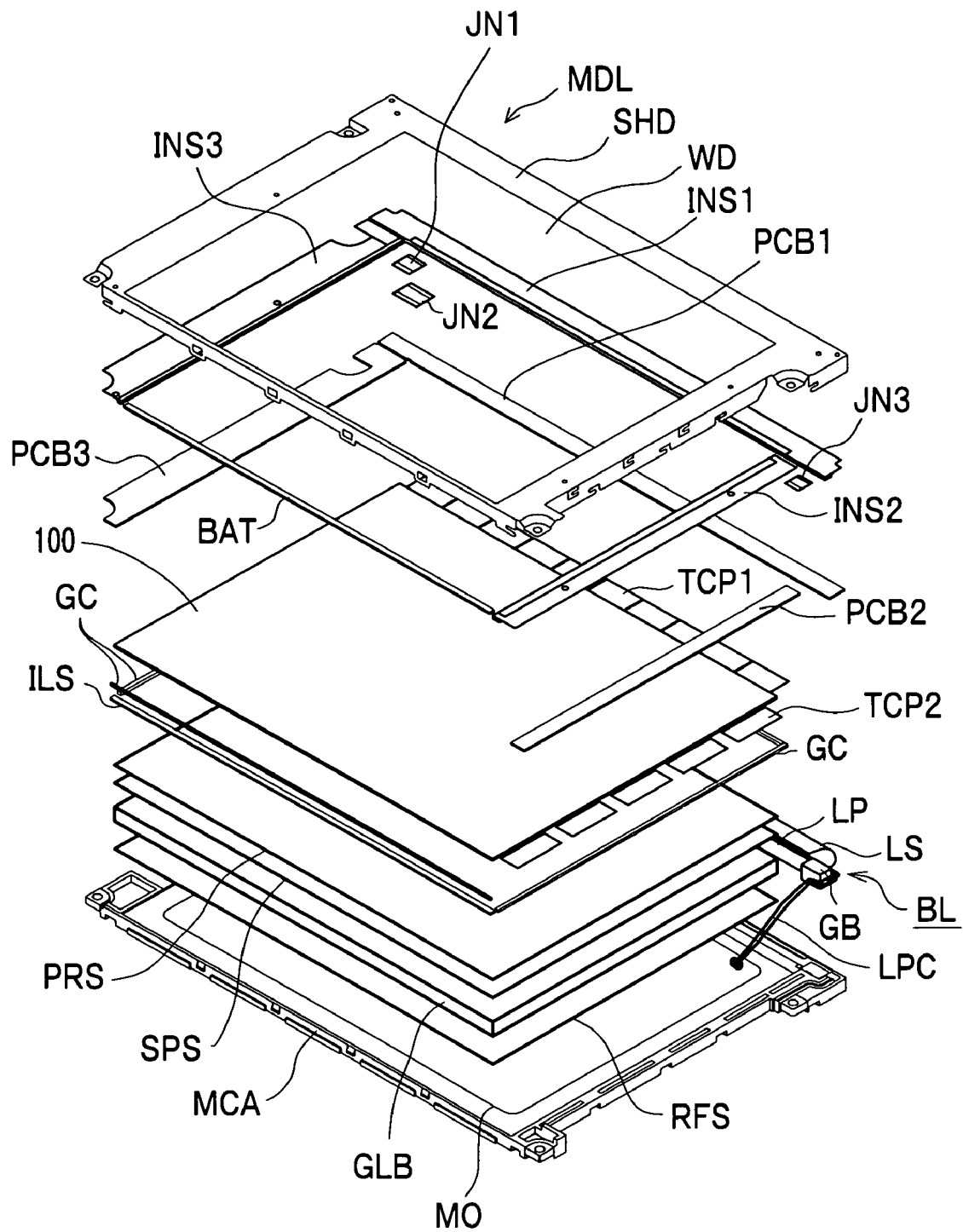
FIG. 9 is a developed perspective view for explaining a liquid crystal display module using the liquid crystal display device according to the present invention.

Next, a liquid crystal display module using the liquid crystal display panel 100 explained heretofore and a modification of the liquid crystal display module are explained. FIG. 9 is a developed perspective view for explaining the liquid crystal display module using the liquid crystal display panel 100 according to the present invention. The liquid crystal display module MDL is formed by integrally incorporating a drive means, a backlight BL, other constitutional parts and the like into the liquid crystal display panel 100. In FIG. 9, reference symbol SHD indicates a shield case (also referred to as a metal frame) formed of a metal plate, reference symbol WD indicates a display window, reference symbols INS1 to INS3 indicate insulating sheets, reference symbols PCB1 to PCB3 indicate circuit boards which constitute the drive means (reference symbol PCB1 indicates a drain side printed circuit board (a drain line drive printed circuit board): a video signal line drive printed circuit board, reference symbol PCB2 indicates a gate side printed circuit board (a gate line drive printed circuit board), and reference symbol PCB3 indicates an interface printed circuit board).

Further, reference symbols JN1 to JN3 indicate joiners for electrically connecting the printed circuit boards PCB1 to PCB3 to each other, reference symbols TCP1, TCP2 indicate tape carrier packages, reference symbol 100 indicates a liquid crystal display panel explained by the above-mentioned respective embodiments, reference symbol GC indicates a rubber cushion, reference symbol ILS indicates a light shielding spacer, reference symbol PRS indicates a prism sheet, reference symbol SPS indicates a diffusing sheet, reference symbol GLB indicates a light guide plate, reference symbol RFS indicates a reflecting sheet, reference symbol MCA indicates a lower case (a mold frame) formed by integral molding, reference symbol MO indicates an opening of the lower case MCA, reference symbol LP indicates a fluorescent lamp, reference symbol LPC indicates a lamp cable, reference symbol GB indicates a rubber bush which supports the fluorescent lamp LP, reference symbol BAT indicates a double-faced adhesive tape, and reference symbol BL indicates a backlight made of the fluorescent lamp LP, the light guide plate GLB and the like. The diffusing sheet members are stacked in the arrangement relationship shown in the drawing to assemble the liquid crystal display module MDL.

The liquid crystal display module MDL has two kinds of accommodating/holding members, the lower case MCA and the shield case SHD, and is constituted by joining the shield case SHD and the lower case MCA together. The insulating sheets INS1 to INS3, the printed circuit boards PCB1 to PCB3 and the liquid crystal display device PNL are fixedly accommodated in the shield case SHD made of a metal, while the backlight BL formed of the fluorescent lamp LP, the light guide plate GLB, the prism sheet PRS and the like is accommodated in the lower case MCA.

An integrated circuit chip for driving the respective pixels of the liquid crystal display panel 100 is mounted on the video signal line drive printed circuit board PCB1. Mounted on the interface printed circuit board PCB3 are electronic circuits such as an integrated circuit chip for receiving video signals from an external host computer as well as control signals such as timing signals, and a timing converter TCON for processing timing and generating clock signals.

The clock signals generated by the timing converter TCON are supplied to the integrated circuit chip which is mounted on the video signal line drive printed circuit board PCB1 via clock signal lines CLL which are formed on the interface printed circuit board PCB3 and the video signal line drive printed circuit board PCB1.

The interface printed circuit board PCB3 and the video signal line drive printed circuit board PCB1 are multi-layered printed wiring boards, and the clock signal lines CLL are formed as inner-layer lines of the interface printed circuit board PCB3 and the video signal line drive printed circuit board PCB1.

Here, the drain side printed circuit board PCB1 for driving the thin film transistors, the gate side printed circuit board PCB2 and the interface printed circuit board PCB3 are connected to the liquid crystal display panel 100 by the tape carrier packages TCP1, TCP2, and the respective printed circuit boards are connected by the joiners JN1, JN2, JN3. The liquid crystal display panel 100 is of the IPS type, the PVA type or the ASV type having the constitution of the above-described embodiments.

The constitution shown in FIG. 9 merely constitutes one example and there may be the constitution in which the drive printed circuit board of the liquid crystal display device is directly mounted on a peripheral end portion of the substrate which constitutes the liquid crystal display device. In such a case, each drive printed circuit board (semiconductor chip) and a portion of the signal line are formed on the substrate and, in place of the gate side printed circuit board and the drain side printed circuit board, a flexible printed circuit board on which lines and a plurality of electronic parts are mounted is used.

Figure 10:
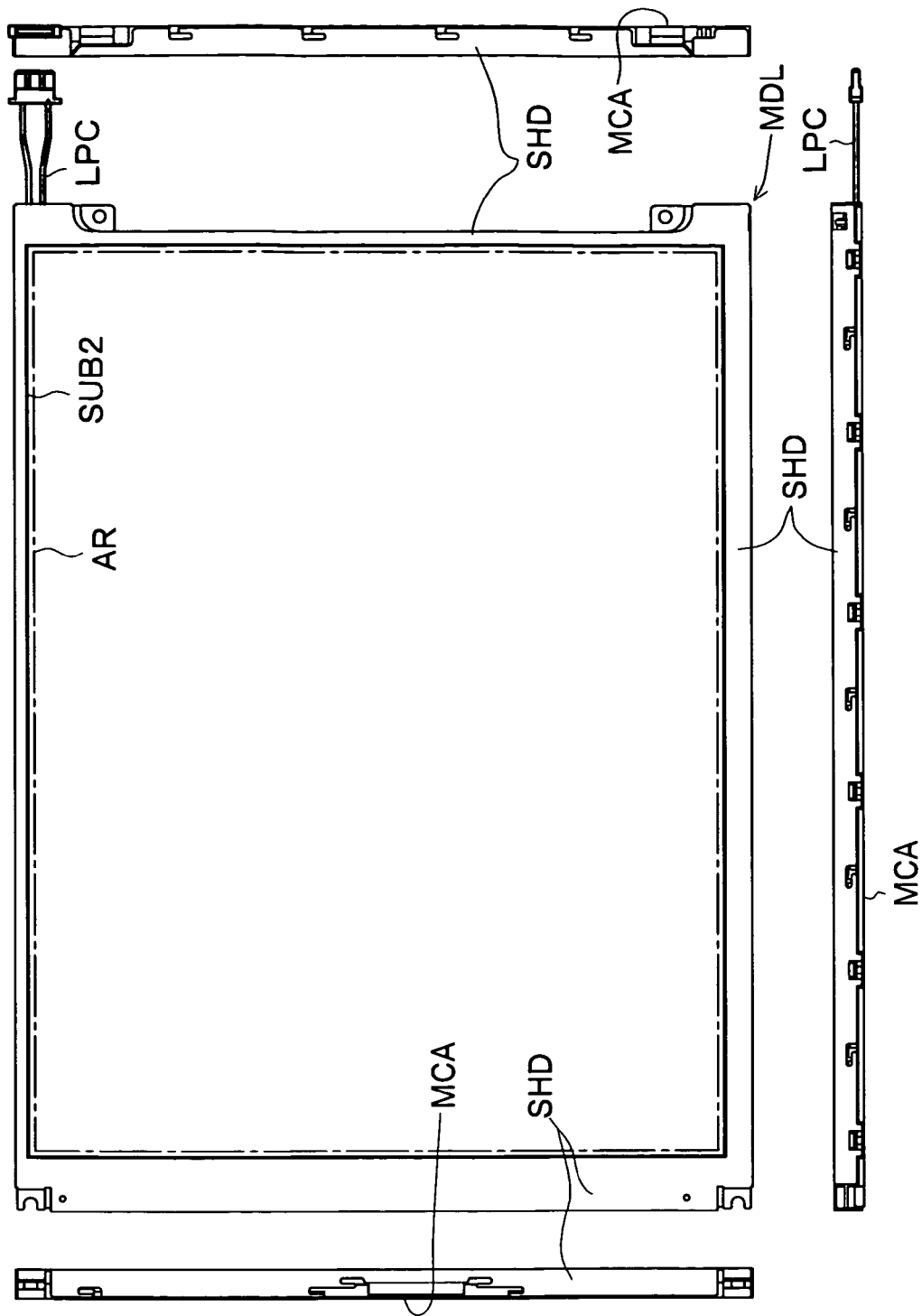
FIG. 10 is a front view and side views of the liquid crystal display module after completion of assembling.

FIG. 10 is a front view and a side view for explaining the constitution of the liquid crystal display module MDL after assembling. In FIG. 10, the area exposed in the display window WD of the shield case SHD is a region (display region) 10 in which an image is to be displayed, and a polarizer is provided on the outermost surface of the region 10. The shield case SHD and the molded case MCA are fixed to each other by caulking using pawls. The fluorescent lamp LP which constitutes the backlight BL is accommodated in the inside of the upper side of the liquid crystal display module MDL, and lamp cables LPC for supplying electricity are led from the upper side.

Further, in the constitution in which the drive circuit is mounted on one of long sides, a liquid crystal filling port which is explained in the above-mentioned embodiments is formed in another long side which faces the one long side in an opposed manner. This liquid crystal display device (the liquid crystal display module MDL) is mounted on a display monitor or a display part of a personal computer.

Figure 11:
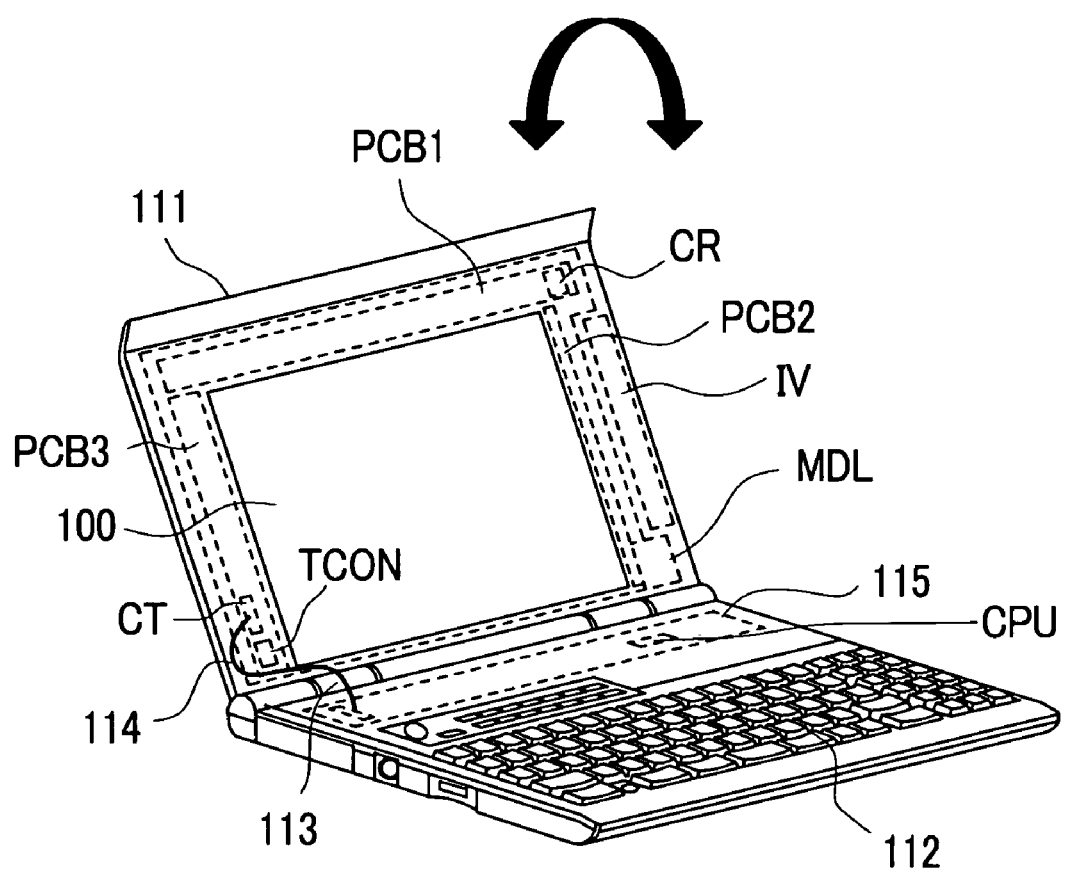
FIG. 11 is a perspective view of a notebook-type computer as one example of electronic equipment on which the liquid crystal display device according to the present invention is mounted.
Figure 12:
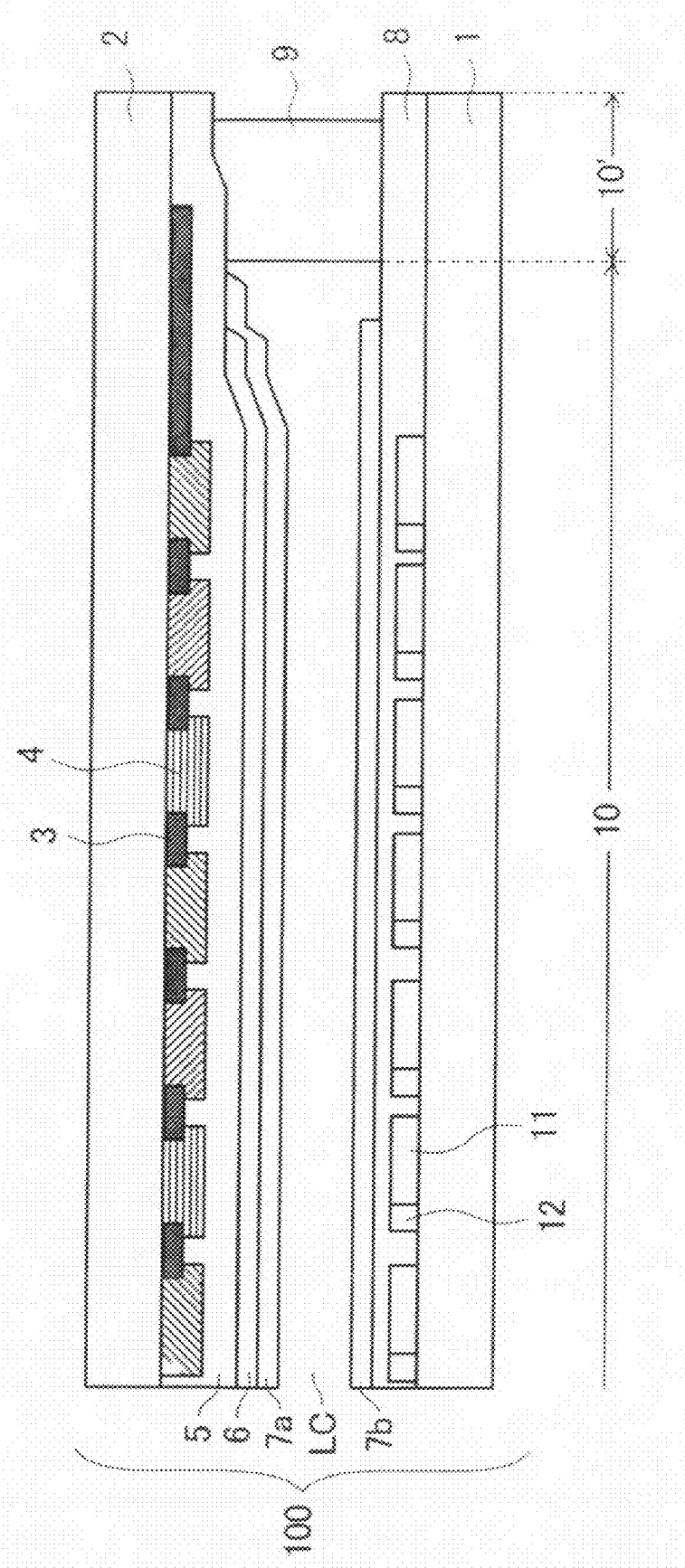
FIG. 12 is an enlarged cross-sectional view of an essential part of a sealing portion for explaining one example of the constitution of a liquid crystal display panel which is applied to a conventional liquid crystal display device.
Figure 13A:
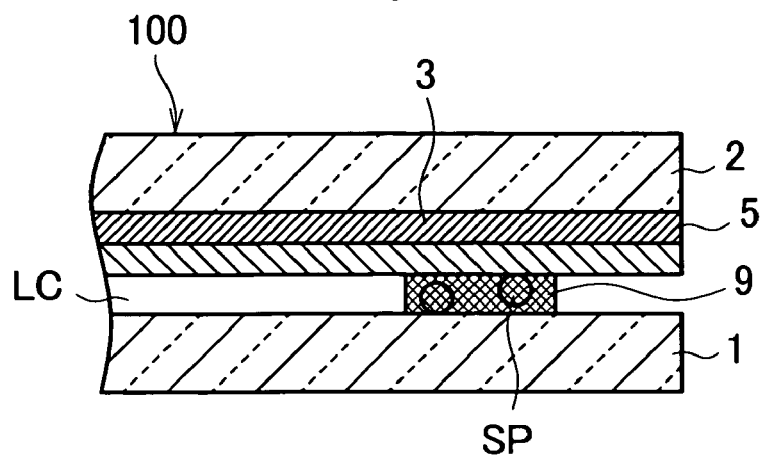
Figure 13B:
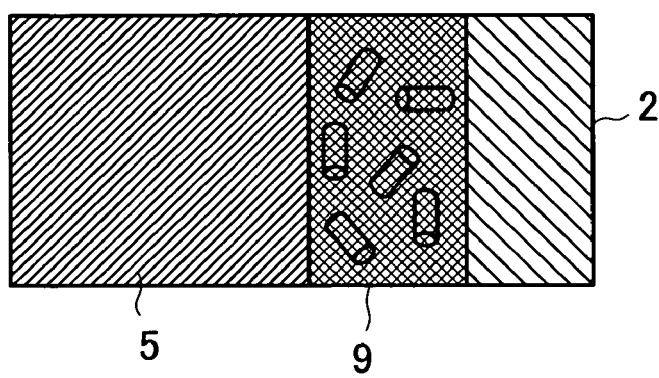
Figure 13C:
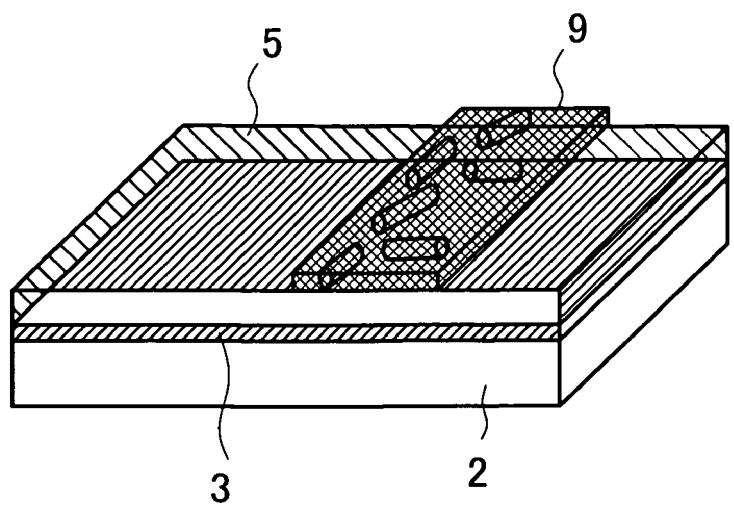

FIG. 11 is a perspective view of a notebook type computer as one example of electronic equipment on which the liquid crystal display device according to the present invention is mounted. This notebook type computer (mobile personal computer) is constituted of a keyboard part 112 (body part) and a display part 111 which is joined to the keyboard part by hinges 113. The keyboard part 112 accommodates signal generating functions such as a keyboard, a host 115 (host computer) and a CPU. The display part 111 has the liquid crystal panel 100, and the drive printed circuit boards PCB1, PCB2, the interface printed circuit board PCB3 which mounts the control chip TCON thereon, and an inverter power source board IV which is a backlight power source are mounted in the periphery of the liquid crystal display panel 100. Here, a connector CT of the PCB3 of the display part 111 and the keyboard part 112 are connected by the cable 114 using the hinges 113.

Then, a liquid crystal display module is constituted by integrally assembling the liquid crystal display panel 100, the various printed circuit boards PCB1 to PCB3, an inverter power source substrate, and a backlight. By incorporating the liquid crystal display panel 100 of the above-mentioned embodiment into this liquid crystal display device, it is possible to provide a notebook type computer of high quality which can acquire image display of high quality and high reliability free from the generation of bubbles in the inside of the display panel attributed to peeling-off of the black matrix film on an interface with the second substrate (glass substrate 2) over the whole surface of the display region.

What is claimed is:

1. A liquid crystal display device having a liquid crystal display panel formed by sandwiching a liquid crystal layer between a pair of substrates, wherein
the liquid crystal display panel is configured such that the liquid crystal layer is surrounded by a sealing material having a predetermined width,
a first organic resin film and a second organic resin film are arranged on one substrate out of the pair of substrates in a state that the first organic resin film and the second organic resin film overlap the sealing material from one substrate side, and the first organic resin film is formed, in the widthwise direction of the sealing material, into a planar shape until a middle position of the sealing material from a side on which the liquid crystal layer is arranged, and is formed into a slit shape from the middle position.

2. A liquid crystal display device according to claim 1, wherein the liquid crystal display panel is configured such that the second organic resin film is inserted into slit-shaped slit portions formed in the first organic resin film.

3. A liquid crystal display device according to claim 2, wherein the liquid crystal display panel is configured such that the second organic resin film is brought into contact with one substrate at the slit portions.

4. A liquid crystal display device according to claim 1, wherein the liquid crystal display panel is configured such that the first organic resin film extends from a region where the liquid crystal layer is arranged.

5. A liquid crystal display device according to claim 1, wherein the liquid crystal display panel is configured such that color filters are arranged on one substrate, and the first organic resin film is made of the same material as a light shielding film arranged between the color filters.

6. A liquid crystal display device according to claim 5, wherein the liquid crystal display panel is configured such that the second organic resin film is made of the same material as an overcoat layer arranged over the color filters.

* * * * *